US009424462B2

(12) United States Patent
Otsuka et al.

(10) Patent No.: US 9,424,462 B2
(45) Date of Patent: Aug. 23, 2016

(54) OBJECT DETECTION DEVICE AND OBJECT DETECTION METHOD

(71) Applicant: Hitachi Automotive Systems, Ltd., Hitachinaka-shi, Ibaraki (JP)

(72) Inventors: Yuji Otsuka, Hitachinaka (JP); Hiroto Mitoma, Hitachinaka (JP); Ryo Ota, Hitachinaka (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 0 days.

(21) Appl. No.: 14/441,419

(22) PCT Filed: Oct. 11, 2013

(86) PCT No.: PCT/JP2013/077694
§ 371 (c)(1),
(2) Date: May 7, 2015

(87) PCT Pub. No.: WO2014/073322
PCT Pub. Date: May 15, 2014

(65) Prior Publication Data
US 2015/0278578 A1 Oct. 1, 2015

(30) Foreign Application Priority Data

Nov. 8, 2012 (JP) ................................. 2012-246693

(51) Int. Cl.
*G06K 9/00* (2006.01)
*G08G 1/16* (2006.01)
*G06T 7/00* (2006.01)

(52) U.S. Cl.
CPC ....... *G06K 9/00201* (2013.01); *G06K 9/00369* (2013.01); *G06K 9/00805* (2013.01);
(Continued)

(58) Field of Classification Search
None
See application file for complete search history.

(56) References Cited

U.S. PATENT DOCUMENTS

2011/0234805 A1* 9/2011 Matsuda .................. B60R 1/00
348/148
2012/0020519 A1* 1/2012 Yashiro .............. G06K 9/00369
382/103

(Continued)

FOREIGN PATENT DOCUMENTS

JP    2001-52171 A    2/2001
JP    2002-183737 A   6/2002

(Continued)

OTHER PUBLICATIONS

Bertozzi et al (NPL: "Stereo Vision-based approaches for Pedestrian Detection", Dip. Ingegneria dell'Informazione, Universita di Parma, p. 7, hereafter referred to as Bertozzi).*

(Continued)

*Primary Examiner* — Bhavesh Mehta
*Assistant Examiner* — Oneal R Mistry
(74) *Attorney, Agent, or Firm* — Crowell & Moring LLP

(57) ABSTRACT

To provide an object detection device and an object detection method in which incorrect grouping based on a range image can be prevented, processing is implemented including: generating a range image based on a pair of gray-scaled images (S603); grouping adjacent regions having range data representing close distances in the range image (S604); calculating differences between the luminance values of pixels in a vertical line below a ground plane above which objects are imaged and the luminance values of pixels in a vertical line above the ground plane in the gray-scaled images and dividing the group region into laterally separated sub-regions (S605); and determining whether or not there is a section without vertical edge in either of the left and right areas of each of sub-regions made based on the gray-scaled images and merging sub-regions whose areas including a section without vertical edge are next to each other (S607).

5 Claims, 9 Drawing Sheets

(52) U.S. Cl.
CPC ............ *G06T7/0081* (2013.01); *G08G 1/166* (2013.01); *G06T 2207/10021* (2013.01); *G06T 2207/10028* (2013.01); *G06T 2207/20141* (2013.01); *G06T 2207/30261* (2013.01)

(56) References Cited

U.S. PATENT DOCUMENTS

| | | | |
|---|---|---|---|
| 2012/0206597 A1* | 8/2012 | Komoto | G06T 7/2006 348/135 |
| 2012/0242799 A1* | 9/2012 | Saito | G01S 7/4802 348/46 |
| 2012/0268602 A1* | 10/2012 | Hirai | G06K 9/00798 348/148 |

FOREIGN PATENT DOCUMENTS

| | | |
|---|---|---|
| JP | 2008-65634 A | 3/2008 |
| JP | 2009-139324 A | 6/2009 |

OTHER PUBLICATIONS

International Search Report (PCT/ISA/210) dated Nov. 19, 2013, with English translation (Three (3) pages).

\* cited by examiner

|   | 1 | 2 | 3 |
|---|---|---|---|
| 1 | G | R | G |
| 2 | B | G | B |
| 3 | G | R | G |

|   | 1 | 2 | 3 |
|---|---|---|---|
| 1 | B | G | B |
| 2 | G | R | G |
| 3 | B | G | B |

GROUP REGION MADE BY GROUPING BASED ON RANGE IMAGE

SUB-REGIONS INTO WHICH GROUP REGION WAS DIVIDED BASED ON GRAY-SCALED IMAGE

GROUP REGION MADE BY GROUPING BASED ON RANGE IMAGE

SUB-REGIONS INTO WHICH GROUP REGION WAS DIVIDED BASED ON GRAY-SCALED IMAGE

REGION MADE BY MERGING SUB-REGIONS

OBJECT DETECTION DEVICE AND OBJECT DETECTION METHOD

TECHNICAL FIELD

The present invention relates to an object detection device and an object detection method for detecting an object based on a range image which has been generated based on a pair of gray-scaled images.

BACKGROUND ART

In Patent Literature (PTL) 1, it is disclosed that an object detection device that detects an object based on a range image which is generated by stereo image processing evaluates the reliability of range data in the range image, extracts valid range data and invalid range data, and performs grouping to detect a single object, based on these valid and invalid range data.

CITATION LIST

Patent Literature

PTL 1: Japanese Patent Application Laid-Open No. 2008-065634

SUMMARY OF INVENTION

Technical Problem

However, by the grouping based on valid and invalid range data in a range image, due to the concentration of valid range data on the right and left edges of an object, sufficient information cannot be obtained and it was difficult to prevent taking a plurality of objects that line at the same distance as a single object.

In a case of monitoring a vehicle and its surroundings, if there are a pedestrian and a motorcycle besides a preceding vehicle, for example, incorrectly grouping a vehicle and a pedestrian together, if occurs, makes it unable to execute vehicle control actions that differ for a vehicle and a pedestrian, such as sufficiently decelerating the vehicle upon detection of a pedestrian and making the vehicle properly follow the preceding vehicle or sounding a start alarm if the preceding vehicle has been detected.

Thus, the present invention is intended to provide an object detection device and an object detection method in which incorrect grouping based on a range image can be prevented.

Solution to Problem

Therefore, an object detection device of the present invention has been arranged to include a range image generating unit that generates a range image based on a pair of gray-scaled images, a grouping unit that groups adjacent regions having range data representing close distances in the range image; and a dividing unit that divides a group region created by the grouping based on the gray-scaled images.

Besides, an object detection method of the present invention has been arranged to include the following steps: generating a range image based on a pair of gray-scaled images; grouping adjacent regions having range data representing close distances in the range image; and dividing a group region created by the grouping based on the gray-scaled images.

Advantageous Effects of Invention

According to the present invention, it is possible to prevent incorrect grouping based on a range image.

DESCRIPTION OF EMBODIMENTS

In the following, an embodiment of the present invention will be described with the aid of the drawings.

Figure 1:
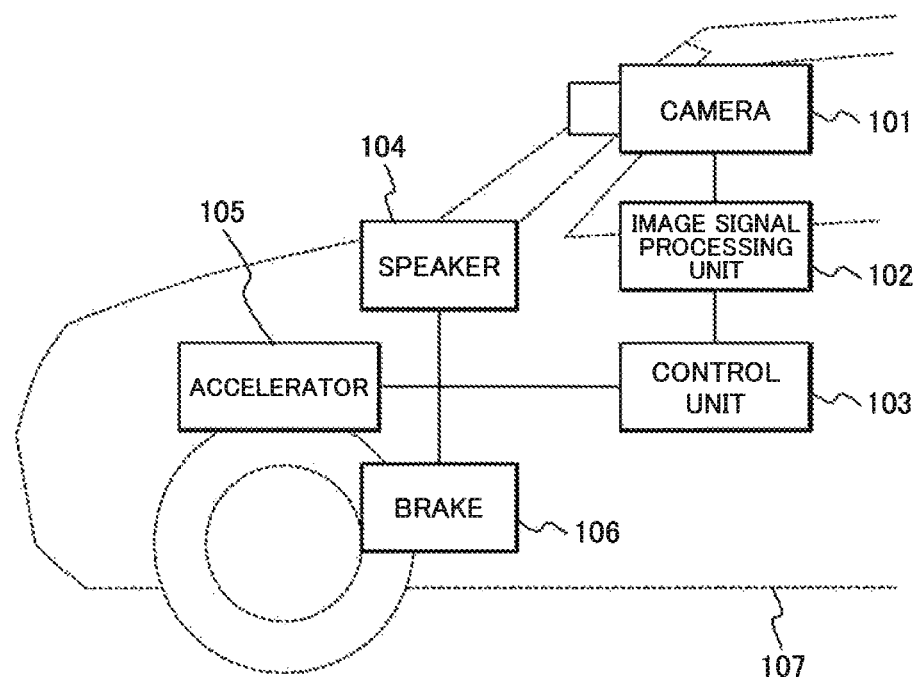
FIG. 1 is a block diagram depicting a structure of a vehicle driving assist system according to an embodiment of the present invention.

FIG. 1 is a block diagram depicting a structure of a vehicle driving assist system which implements Forward Collision Warning (FCW) and Adaptive Cruise Control (ACC) as an example of an object detection device and method pertaining to the present invention.

In FIG. 1, a camera unit (stereo camera) 101 is installed on a vehicle to capture a field of view in front of the vehicle 107.

An image of the view in front of the vehicle, which has been captured by the camera unit 101, is input to an image signal processing unit 102. The image signal processing unit 102 calculates a distance to a preceding vehicle and its relative speed based on the image of the view in front of the vehicle and sends information such as the distance to the preceding vehicle and its relative speed to a control unit 103.

The control unit 103 determines a degree of risk of collision from the distance to the preceding vehicle and its relative speed and outputs a command to, for example, sound an alarm (Forward Collision Warning) or decelerate the vehicle by applying a brake 106 according to the degree of risk.

If the driver of the vehicle 107 makes the ACC function enabled, the control unit 103 executes control (Adaptive Cruise Control) to make the vehicle follow a preceding vehicle, while keeping a constant distance between the vehicles, or accelerate the vehicle to a setup speed, if no preceding vehicle exists, by controlling an accelerator 105 and the brake 106.

Then, descriptions are provided for a method for detecting a preceding vehicle and others, based on images captured by the camera unit 101, in the above vehicle driving assist system.

Figure 2:
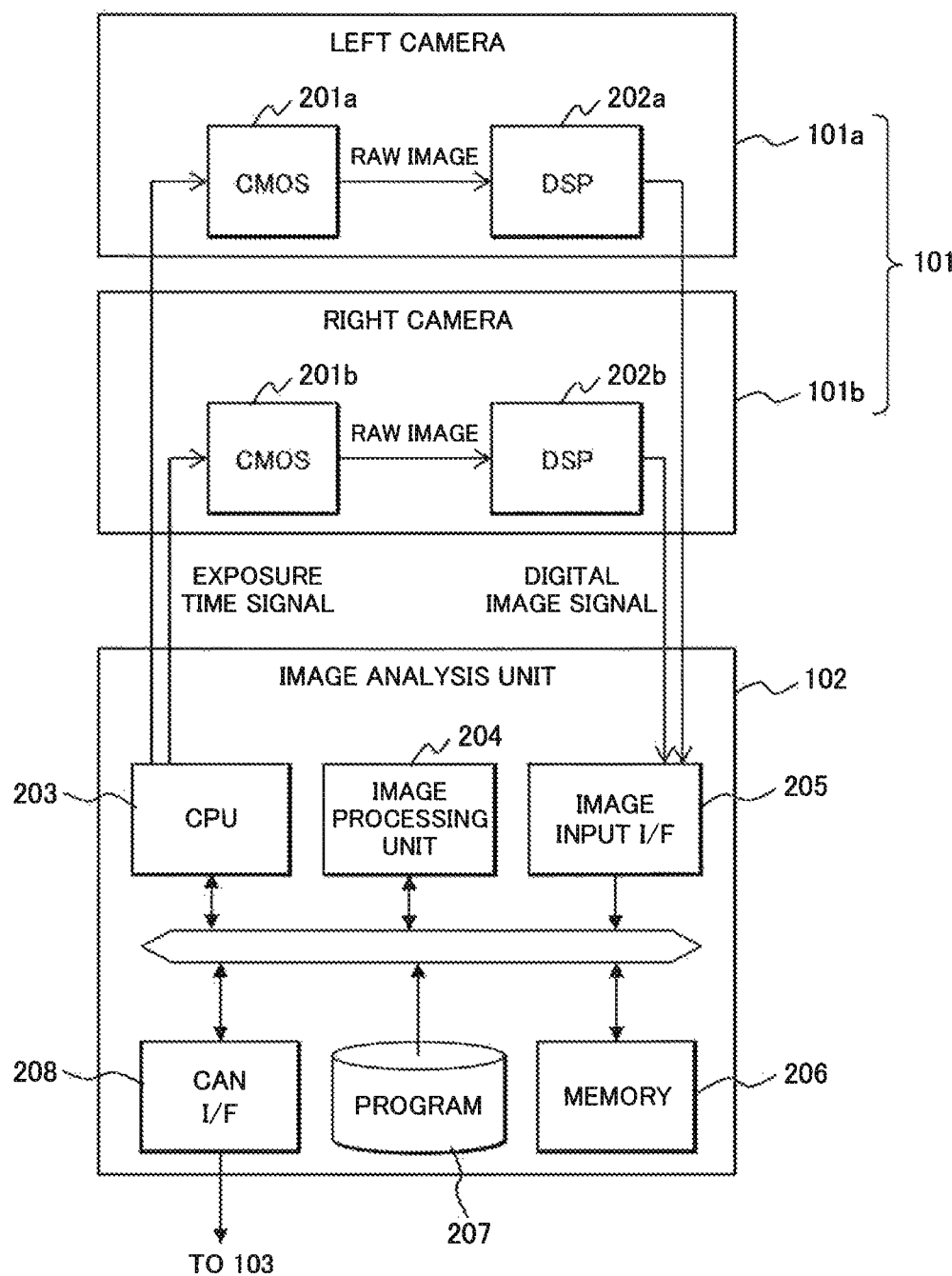
FIG. 2 is a structural diagram of a camera unit and am image signal processing unit according to an embodiment of the present invention.

FIG. 2 is a block diagram depicting the internal structures of the camera unit 101 and the image signal processing unit 102.

The camera unit 101 is configured of a pair of left and right cameras 101*a*, 101*b*. The cameras 101*a*, 101*b* respectively include CMOSs (Complementary Metal Oxide Semiconductors) 201*a*, 201*b* and DSPs (Digital Signal Processors) 202*a*, 202*b*.

The CMOSs 201*a*, 201*b* are imaging elements in which photodiodes to convert light to electric charge are arranged in a grid.

Here, if the CMOSs are color imaging elements, the CMOSs 201 send RAW images (color images) to the DSPs 202 and these images are converted to gray-scaled images by the DSPs 202.

In contrast, if the CMOSs 201 are monochrome imaging elements, they send gray-scaled images directly to an image input I/F 205 of the image signal processing unit 102.

Image signals are serially sent from the camera unit 101 to the image input I/F 205 and a leading signal of them includes a synchronous signal, so that the image input I/F 205 can take in only the images at required timing.

Pairs of left and right gray-scaled images taken in the image signal processing unit 102 via the image input I/F 205 are written into a memory 206 and an image processing unit 204 performs parallax calculation processing and analysis processing based on the images stored in the memory 206.

A series of processing operations in the image processing unit 204 is executed according to a program 207 written in advance into a flash ROM.

A CPU 203 exerts control of taking in images by the image input I/F 205 and image processing performed by the image processing unit 204 and executes necessary calculations.

Each of the CMOSs 201*a*, 201*b* incorporates an exposure control unit for implementing exposure control and a register in which exposure time should be set and each of the CMOSs 201*a*, 201*b* captures an image for an exposure time set in the register.

An exposure time that is set in the register can be rewritten by the CPU 203 and an exposure time rewritten by the CPU 203 is reflected in capturing an image in a next frame or next field.

Exposure time can be controlled electronically and the amount of light incident on the CMOSs 201*a*, 201*b* is constrained by exposure time.

Exposure time control can be implemented by an electronic shutter method as above and can also be implemented by using a method of opening and closing a mechanical shutter. Also, the amount of exposure can be changed by adjusting a diaphragm. In a case of alternate line scanning as in interlacing, the amount of exposure can be changed between odd lines and even lines.

The image signal processing unit 102 sends information corresponding to a distance to a preceding vehicle and its relative speed among others to the control unit 103 via a CAN I/F 208 and the control unit 103 implements Forward Collision Warning and Adaptive Cruise Control, and the like based on the information sent thereto.

The following will describe processing of conversion to gray-scaled images which is performed by the DSPs 202*a*, 202*b*.

If the CMOSs 201*a*, 202*b* are color imaging elements, they measure the intensity of any one color of red (R), green (G), and blue (B) for a pixel of interest and estimate the intensities of other colors by referring to the intensities of colors measured for pixels that surround the pixel of interest. For example, R, G, and B of a central G22 pixel in FIG. 3(*a*) can be calculated respectively by way of Equation 1.

$$\begin{cases} R = \dfrac{R_{12} + R_{32}}{2} \\ G = G_{22} \\ B = \dfrac{B_{21} + B_{23}}{2} \end{cases} \quad \text{[Equation 1]}$$

Likewise, R, G, and B of a central R22 pixel in FIG. 3(*b*) can be calculated by way of Equation 2.

$$\begin{cases} R = R_{22} \\ G = \dfrac{G_{21} + G_{12} + G_{32} + G_{23}}{4} \\ B = \dfrac{B_{11} + B_{13} + B_{31} + B_{33}}{4} \end{cases} \quad \text{[Equation 2]}$$

R, G, and B values of pixels other than G22 and R22 can be calculated in this way. The intensities of three primary colors of R, G, and B are calculated for all pixels and a color image is obtained. Then, for all pixels, luminance Y is calculated according to Equation 3 and a Y image is created; the Y image is used as a gray-scaled image.

$$Y = 0299R + 0.07G + 0.114B \quad \text{[Equation 3]}$$

From a pair of left and right images captured by the pair of left and right cameras 101*a*, 101*b*, data corresponding to the distances from the cameras to the surface of an object (obstacle) can be output in an image form as range data on a per-pixel basis. This image-form range data is referred to as a range image.

Figures 3A, 3B, 4:
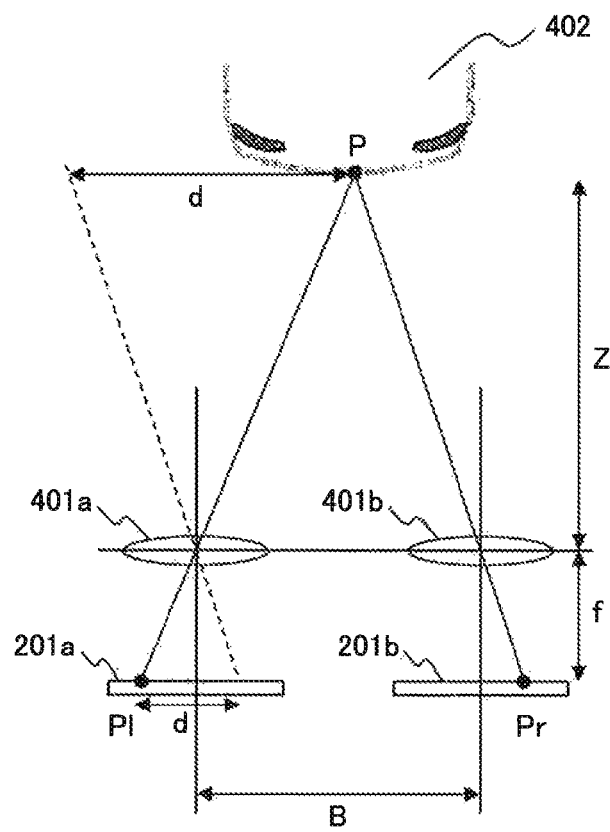
FIGS. 3A AND 3B are diagrams representing examples of a color filter arrangement according to an embodiment of the present invention.
FIG. 4 is a diagram for explaining a distance measuring principle with stereo cameras according to an embodiment of the present invention.

FIG. 4 is a diagram for explaining a distance measuring principle (triangulation) using the pair of left and right cameras 101*a*, 101*b*.

In FIG. 4, a point P on the rear surface of a vehicle 402 (preceding vehicle) which is an object comes out as a point Pr on a right image (base image) captured by the right camera and comes out as a point Pl on a left image (reference image) captured by the left camera.

Given that a focal distance of the cameras is denoted by f, a distance from the principal points of lenses 401*a*, 401*b* to the vehicle 402 is denoted by Z, the length of the base line of the right and left cameras is denoted by B, and a position gap between the point Pr and the point Pl, namely, parallax is denoted by d, distance Z can be calculated by way of Equation 4 from a homothetic ratio of a triangle.

$$Z = \dfrac{Bf}{d} \quad \text{[Equation 4]}$$

Here, because the length of the base line B and the focal distance f are constant values, determining distance Z is equivalent to determining parallax d.

To determine parallax d, it is needed to determine the point Pl on the left image (reference image) captured by the left camera, which corresponds to the point Pr on the right image (base image) captured by the right camera. Because the point Pr and the point Pl are a same position on the object, image portions around both points on the images have virtually the same shape and brightness.

Thus, a method called block matching is used which uses pattern matching to calculate a degree of similarity between a block of m×n pixels on the base image and its corresponding block on the reference image.

Here, m and n are integers of 2 or more. The larger these values, the larger will be the amount of characteristic of a block; thus, incorrect matching can be prevented and robustness is given. But, the distance of an object that is smaller than the block cannot be determined accurately, so m and n should be set to optimal values, taking even a far object into account.

Specifically, m and n should be set to, e.g., 5, so that the size of a block will become sufficiently smaller than the size of a farthest cubic object that is required to be detected.

As a block matching algorithm, a method can be used that calculates SAD (Sum of Absolute Difference), the sum of absolute values of luminance difference for each pixel between the blocks, and selects a block with the smallest SAD value.

A SAD value can be determined by way of Equation 5; the smaller the SAD value, the greater will be the degree of matching in shape (the higher will be the degree of similarity).

$$SAD = \sum_{j=0}^{n-1} \sum_{i=0}^{m-1} |I_l(i, l) - I_r(i, l)| \qquad \text{[Equation 5]}$$

Seeking for a point where the SAD value is smallest on an epipolar line is performed and that point is converted to range data as a parallax. By performing this processing across the whole image area, it is possible to generate a range image (image composed of range data on a per-pixel basis).

Here, note that an optimal parallax is not determined in all blocks of the base image. For example, when pixels in a block have almost no luminance difference, a plain and flat pattern often continues likewise in blocks surrounding the block. In such a case, there is a high degree of similarity anywhere within an even region and, consequently, optimal range data cannot be determined.

Therefore, such blocks with a less amount of characteristic are regarded as an invalid region (invalid range data) for which a result of block matching is ignored. In contrast, blocks having a more amount of characteristic, such as a block of pixels on an edge where there is a luminance difference are regarded as a valid region (valid range data) for which a result of block matching is used, since a result of block matching is reliable.

In the case of stereo cameras placed right and left, block matching is performed in a horizontal direction and parallax calculation is executed. Hence, valid range data tends to concentrate in the vicinity of a vertical edge where there is a luminance difference in a horizontal direction.

Figure 5A:
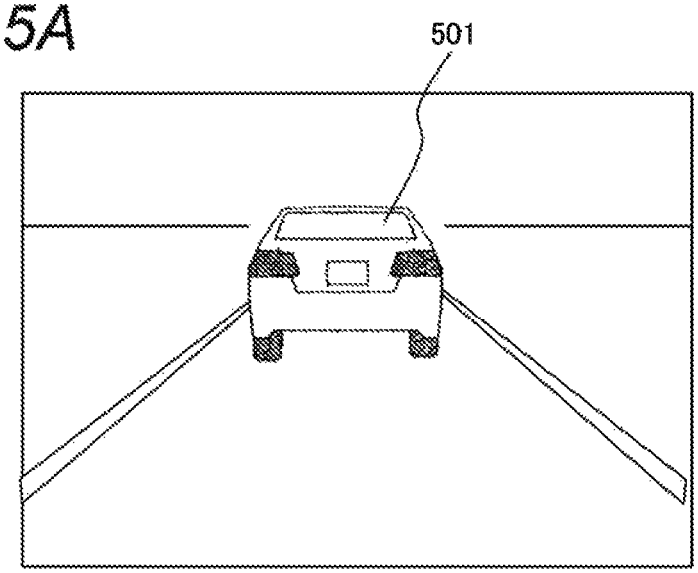
FIGS. 5A and 5B are diagrams representing a gray-scaled image and a range image of a preceding vehicle according to an embodiment of the present invention.
Figure 5B:
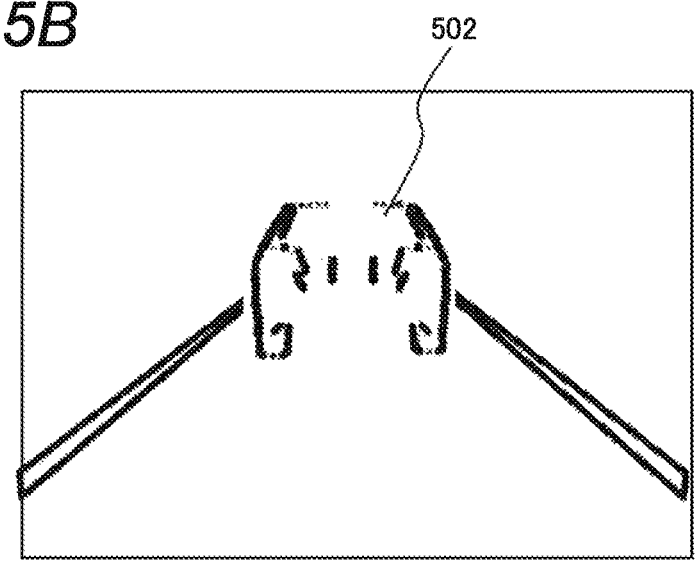

FIG. 5(a) is an example of a view (gray-scaled image) of a preceding vehicle 501 and FIG. 5(b) represent valid regions (valid range data) in a range image corresponding to the view of the preceding vehicle in FIG. 5(a).

Black line regions presented in FIG. 5(b) are vertical edge portions and, at the same time, valid regions where range data is valid and the reliability of range data is high in the black line regions.

A valid region and an invalid region with regard to a result of block matching (parallax) are judged by using an index value T which is calculated according to Equation 6.

$$T = \frac{\sum_{j=0}^{n-1} \sum_{i=0}^{m-2} |I_r(i, j) - I_r(i+l, j)|}{(m-1) \times n} \qquad \text{[Equation 6]}$$

An index value T which is calculated according to Equation 6 represents an average of luminance differences between adjacent pixels in a horizontal direction within a block. If the index value T is more than or equal to a predetermined value (e.g., 5), it indicates that the block has a more amount of characteristic and the reliability of range (parallax) is high and the block is judged as a valid region where range data is valid (valid range data). In contrast, if the index value T is less than the predetermined value, it indicates that the block has a less amount of characteristic and the block is judged as an invalid region where range data is invalid (invalid range data).

Here, in the case where the object is a preceding vehicle, in an image part corresponding to the rear surface of the vehicle, generally, a plain and flat luminance pattern continues and range data is often regarded as invalid. Hence, valid regions (valid range data) are often separate at right and left edges of the vehicle image, like the preceding vehicle 502 in FIG. 5(b).

Figure 6:
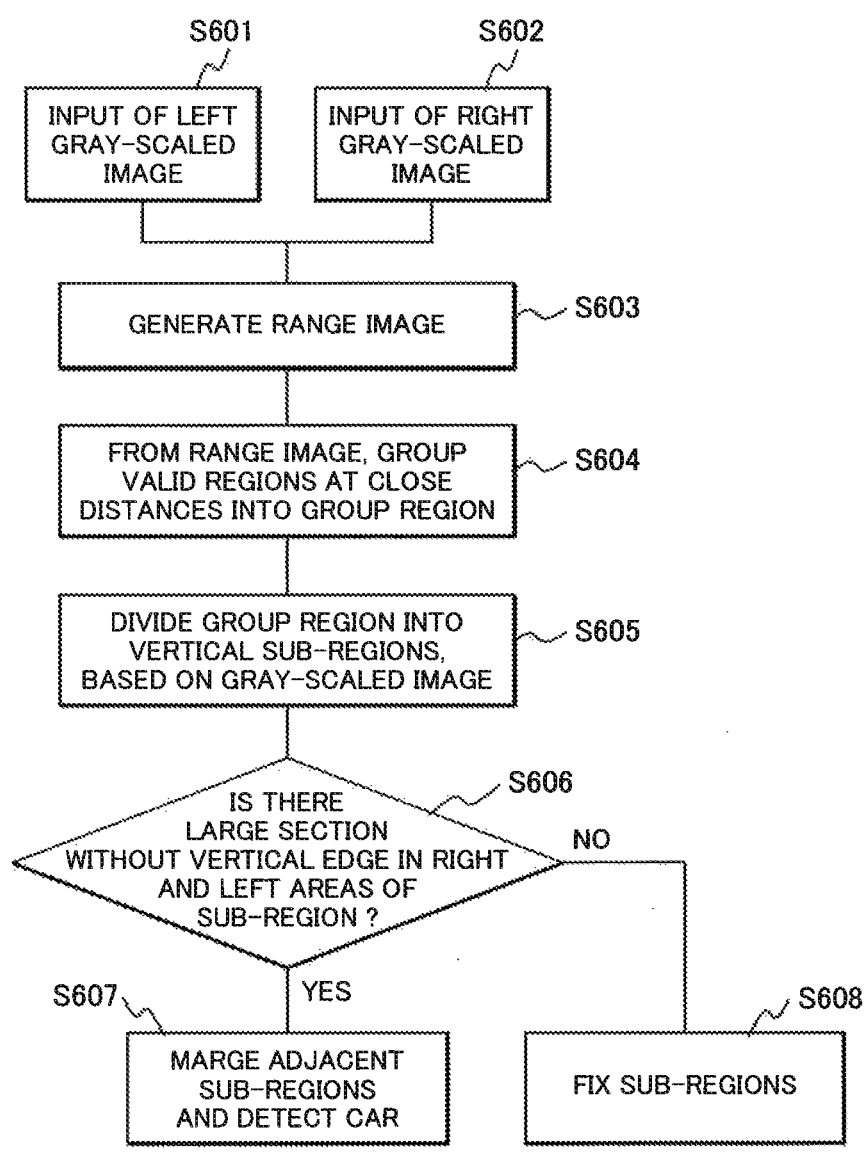
FIG. 6 is a flowchart illustrating a grouping process flow according to an embodiment of the present invention.

FIG. 6 is a flowchart illustrating an object detection processing flow including grouping of valid regions.

In object detection processing which is illustrated in the flowchart of FIG. 6, the following are performed: generating a range image composed of range data (parallax data) on a per-pixel basis, based on a pair of right and left gray-scaled images, and grouping together adjacent regions at close distances among valid regions in the range image. Then, a group region into which valid regions were grouped based on the range image is divided into sub-regions according to the clipping boundaries of the regions of objects based on the gray-scaled images (luminance data). Further, it is determined whether or not a single object region has been divided by the above dividing, based on vertical edges in the gray-scaled images. If a single object region is divided, its sub-regions are merged.

FIG. 7 and FIG. 8 are diagrams representing examples of results of the processing performed by the procedure illustrated in the flowchart of FIG. 6.

FIG. 7 presents examples in which three pedestrians stand side by side at a substantially equal distance from the vehicle equipped with the cameras; this is a scene where incorrect grouping is liable to take place, since the width of the space in which these three persons stand is similar to the width of a preceding vehicle at a distance similar to the distance at which they stand from the vehicle equipped with the cameras.

FIG. 8 presents examples in which a pedestrian stands near a vehicle. If it is set up to actuate the brake at earlier timing (from a farther distance) when an obstacle is a pedestrian than when the obstacle is a vehicle, in a scene as presented in FIG. 8, unless the vehicle and the pedestrian are separated early, the timing to actuate the brake upon detecting the pedestrian will be delayed.

The object detection processing is detailed below according to the flowchart of FIG. 6.

First, at step S601 and a step S602, gray-scaled images are acquired, respectively, from images captured by the left and right cameras 101a, 101b.

If the cameras 101a, 101b are equipped with monochrome imaging elements, gray-scaled images in an image form can be acquired directly. But, if the cameras are equipped with color imaging elements, gray-scaled images are acquired by converting signals corresponding to three primary colors to signals of luminance Y, namely, a gray-scale form, according to Equations 1, 2, and 3, provided previously.

At next step S603 (a range image generating unit), a range image is generated by determining a parallax with regard to a same object through block matching based on a pair of right and left gray-scaled images.

Further, at step S604 (a grouping unit), grouping together adjacent valid regions having range data representing close distances in the range image is performed.

Figure 7A:
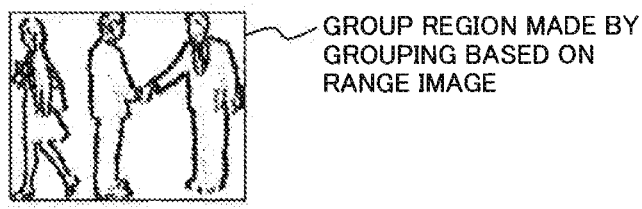
FIGS. 7A-7D are diagrams representing results of processing for a plurality of pedestrians according to an embodiment of the present invention.
Figure 8A:
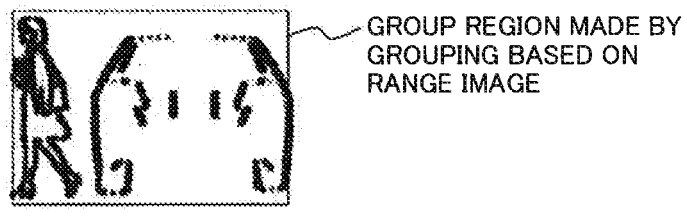
FIGS. 8A-8D are diagrams representing results of processing for a pedestrian and a preceding vehicle according to an embodiment of the present invention.

FIG. 7(a) and FIG. 8(a) are diagrams presenting examples of results of grouping in the step S604.

By grouping valid regions having range data representing close distances, it is possible to separate and detect objects located at different distances from the vehicle equipped with the cameras. However, in a case where a plurality of objects (such as a plurality of pedestrians or a pedestrian and a vehicle) are located, lining at a substantially same distance, there is a possibility of incorrectly grouping these objects as a same object.

In an example presented in FIG. 7(a), three pedestrians line sideways at a substantially same distance and their regions are grouped into rectangular region including these three pedestrians. In an example presented in FIG. 8(a), one pedestrian and a vehicle line sideways and their regions are grouped into a rectangular region including the one pedestrian and the vehicle.

For example, when grouping is performed as in the example presented in FIG. 8(a), it is unable to separate and detect the vehicle and the pedestrian and the timing to actuate the brake upon detecting the pedestrian will be delayed.

Therefore, at next step S605 (a dividing unit), it is determined whether or not a group region into which valid regions were grouped as a same object image based on the range image can be divided, based on the clipping boundaries of the regions of objects based on the gray-scaled images; if the group region can be divided, that is, a plurality of different objects are included in the single group region, the group region is divided according to the clipping boundaries of the regions of objects based on the gray-scaled images.

This rectifies incorrect grouping processing based on range data and makes it possible to separate and detect a plurality of objects which are located, lining at a substantially same distance.

Now, divide processing in the step S605 will be detailed with reference to FIG. 9.

In the step S605, it is determined whether or not a group region can be divided based on luminance difference in a vertical direction in a gray-scaled image; if so, the group region is divided.

Figure 9A:
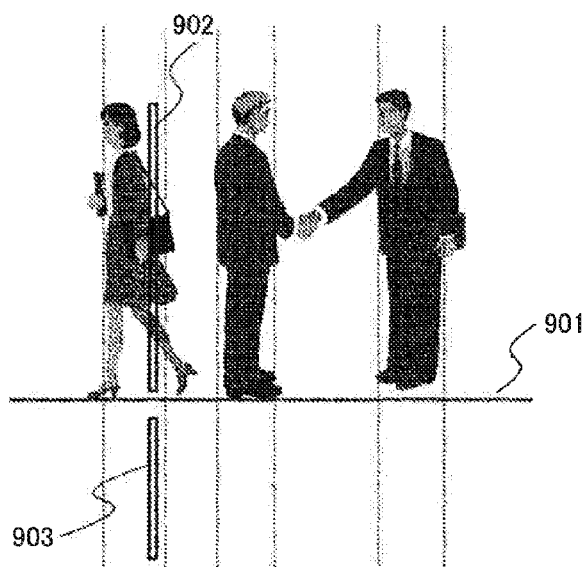
FIGS. 9A and 9B are diagrams depicting divide processing based on a gray-scaled image according to an embodiment of the present invention.

First, as depicted in FIG. 9(a), in a gray-scaled image, determining an average of luminance values of pixels in a vertical line 903 below a ground plane 901 above which the objects are imaged (an average luminance of road surface) is performed. Absolute values of differences between the luminance values of pixels in a vertical line 902 above the ground plane 901 and the average luminance of road surface are accumulated.

That is, when the Y coordinate of the ground plane 901 is assumed to be 0, luminance difference D between image parts above and blow the ground plane 901 is calculated for each vertical line according to Equation 7.

$$D = \sum_{j=0}^{h} |I_r(i, j) - AR|$$ [Equation 7]

$$AR = \frac{\sum_{k=-10}^{-1} I_r(i, k)}{10}$$

Here, "h" in Equation 7 is an apparent height (pixel) of an object (cubic object) in the image.

Vertical lines for which luminance difference D is calculated can be set to be evenly cut in a horizontal direction of the image and the width of a vertical line can be set to the width of one pixel or a plurality of pixels. The ground plane 901 corresponds to the pedestrian's footing position and the contact area of the tires of a vehicle; for example, a substantially horizontal plane that is continuously present at the bottom of a group region created from the range image can be defined as the ground plane 901.

Luminance difference typically occurs between the road surface and an object imaged above the road surface and it is presumable that the road surface is imaged in an image part below the ground plane 901. Thus, for a region above the ground plane 901, if its luminance differs to a large degree from the luminance of the image part (road surface) below the ground plane 901, that region can be presumed to be the region of an object (such as a pedestrian or vehicle). For a region above the ground plane 901, conversely, if its luminance differs to a small degree from the luminance of the image part (road surface) below the ground plane 901, that region can be presumed to be the region as an extension of the road surface.

Figure 9B:
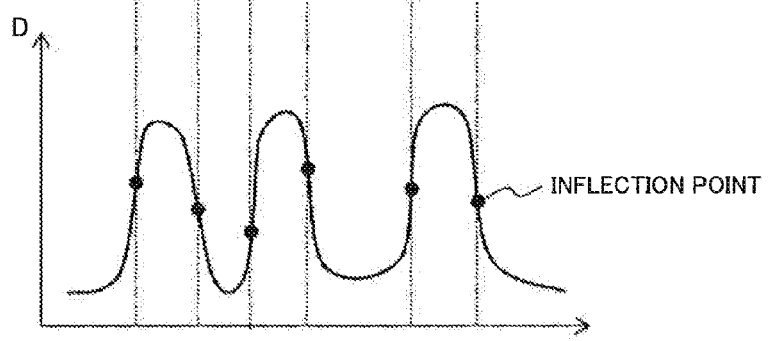

A result of the above luminance difference D calculation executed for each vertical line in the gray-scaled image is represented in FIG. 9(b).

FIG. 9 represents the image of a scene where three pedestrians line sideways as in FIG. 9(a). As represented in FIG. 9(b), in image portions corresponding to the spaces between each of the three pedestrians, luminance difference D decreases, since the load surface is imaged in both image parts above and below the ground plane 901. On the other hand, in image portions where the three pedestrians stand, luminance difference D is larger than that of the image portions where the load surface is imaged in upper and lower parts, since the road surface is imaged in the image part below the ground plane 901, whereas the pedestrians are imaged in the image part above the ground plane 901 along a same vertical line.

In the result, in a horizontal direction, luminance difference D increases and its curve forms a concave in the image portions where the pedestrians stand and decreases and its curve forms a convex in the image portions between the pedestrians. Based on such a change of luminance difference D in a horizontal direction, it is possible to clip the regions of objects (the regions of the pedestrians) in a horizontal direction.

Therefore, for example, vertical lines passing through inflection points in the changing curve of luminance difference D in a horizontal direction, that is, boundary lines between a region where luminance difference D is large and a region where luminance difference D is small are set as boundary lines of the regions of objects. A region between these boundary lines, where the curve of luminance difference D forms a concave, is detected as the region of an object (the region of a pedestrian). A region between these boundary lines, where the curve of luminance difference D forms a convex, is detected as an object-less region (the region of the road surface).

Then, if the above boundary lines based on luminance difference D (an object-less region, the region of the road surface) are included in a group region created from range data, it is determined that the group region can be divided and the group region is divided into sub-regions which are in right and left sides of an object-less region extending vertically.

Figure 7B:
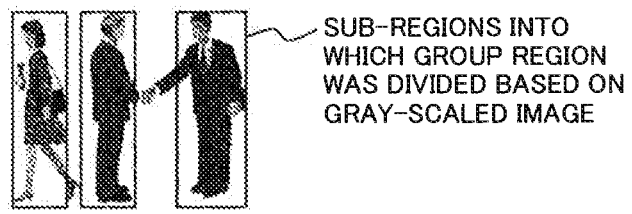
Figure 8B:
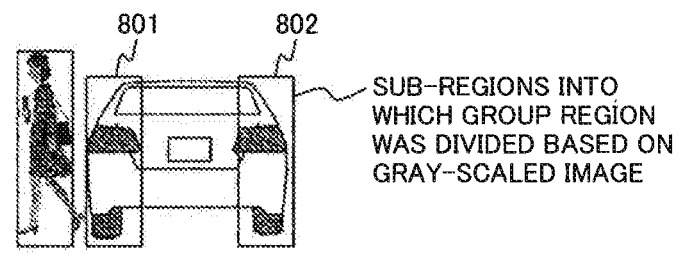

FIG. 7(b) and FIG. 8(b) represent results of the divide processing in the step S605.

In an example presented in FIG. 7, a group region into which three pedestrians were grouped together by grouping based on the range image, which is presented in FIG. 7(a), is divided into sub-regions for each of the three pedestrians by dividing based on the gray-scaled image, which is presented in FIG. 7(b).

Consequently, it is possible to detect obstacles as pedestrians and perform vehicle control (brake control, alarming control) according to the distance to the pedestrians.

In an example presented in FIG. 8, from a group region in to which one pedestrian and a vehicle were grouped together by grouping based on the range image, which is presented in FIG. 8(a), a sub-region of the one pedestrian can be separated by dividing based on the gray-scaled image, which is presented in FIG. 8(b). It is possible to perform vehicle control (brake control, alarming control) according to the distance to the pedestrian.

It is also possible to properly clip the region of the vehicle by dividing based on the gray-scaled image from the group region created from the range data. However, in the case of the vehicle, there is a possibility that the region of the vehicle is separated into right and left spaced portions by dividing based on the gray-scaled image, depending on the image pattern corresponding to the rear surface of the vehicle and situation, as is presented in FIG. 8(b).

In the luminance difference D calculation, for example, in a middle region of the rear surface of a preceding vehicle, if vertical lines 903 below the ground plane 901 are set in a shade region on the road surface and the color of the vehicle is dark, there is not a large luminance difference D between the image parts above and below the ground plane 901 and there is a possibility of erroneously detecting such a region as an object-less region. In this case, a vertical middle region of the rear surface of the preceding vehicle is detected as an object-less region and it follows that the rear surface image of the preceding vehicle is divided into right and left spaced portions, as is presented in FIG. 8(b), and the rear surface of the preceding vehicle is not detected as a single object.

Therefore, at step S606 (a merging unit), it is determined whether or not the result of dividing the group region created from the range image, based on the gray-scaled image, properly clipped a single object region, based on vertical edges. If a single object region is not clipped properly, merging (unifying) sub-regions made by incorrect dividing is performed.

Figure 7C:
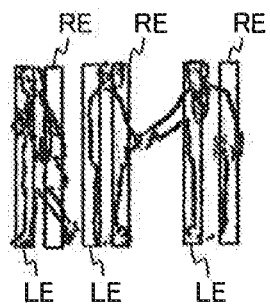
Figure 7D:
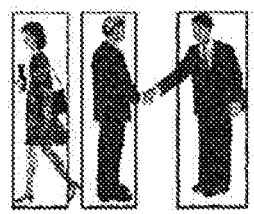
Figure 8C:
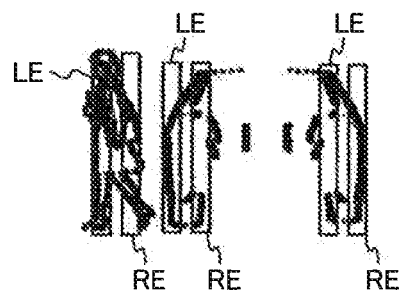
Figure 8D:
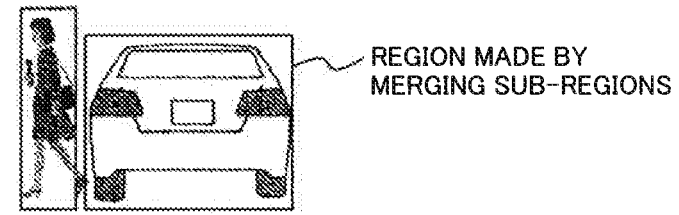

At the step S606, first, right and left areas are defined in each sub-region made by dividing in the step S605, as is presented in FIG. 7(c) and FIG. 8(c), and vertical edge components included respectively in the right and left areas are accumulated. The right area and the left area are the areas with a given width respectively set in right and left sides of a boundary gap in the center in a width direction of each sub-region made by dividing in the step S605.

If each sub-region made by dividing in the step S605 encloses a single object, the object contour will exist in each of the right and left areas. Thus, it is determined whether or not the right and left parts of the object contour are actually included in these areas, based on a cumulative value of vertical edge components.

For example, vertical edges included in the middle region of the rear surface of the vehicle have a characteristic in which they lessen in a bumper portion that is flat. Consequently, when the rear surface image of the preceding vehicle is incorrectly divided into right and left spaced portions, as is presented in FIG. 8(c); of the left and right areas LE, RE set in the left sub-region 801 of the rear surface image, in the right area RE which is inner, there is a section without vertical edge at or near bumper height. Similarly, of the left and right areas LE, RE set in the right sub-region 802 of the rear surface image, in the left area LE which is inner, there is a section without vertical edge at or near bumper height.

Therefore, by analyzing the quantity and distribution of vertical edges in the left and right areas LE, RE, it is checked whether or not there is such a section without vertical edge. If there is a section without vertical edge in one of the left and right areas LE, RE, it is determined that incorrect dividing was performed and processing goes to step S607 (a vehicle detecting unit). In this step, the following are performed: merging sub-regions whose areas including a section without vertical edge are next to each other and detecting an object imaged in the merged region as a preceding vehicle.

Otherwise, if there is not a section without vertical edge in both the left and right areas LE, RE, it is determined that dividing based on the gray-scaled images is correct and processing goes to step S608, where object detection is performed according to the sub-regions made by dividing based on the gray-scaled images.

FIG. 10 is a diagram for explaining an example of the above merging.

Figure 10A:
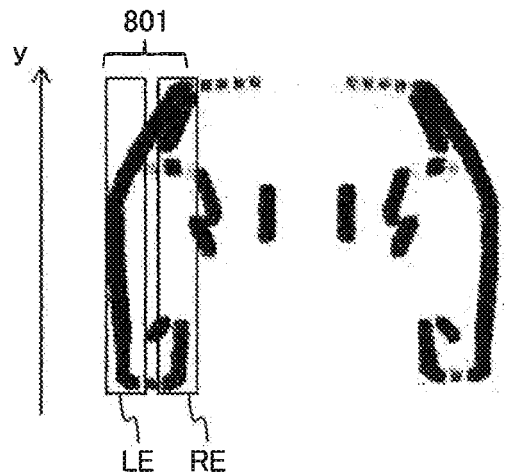
FIGS. 10A-10C are diagrams for explaining merging depending on vertical edges according to an embodiment of the present invention.

As is presented in FIG. 10(a), left and right areas LE, RE are set in a sub-region made by dividing according to the gray-scaled image and a cumulative value of vertical edge components in each of the left and right areas LE, RE is calculated.

Figure 10B:
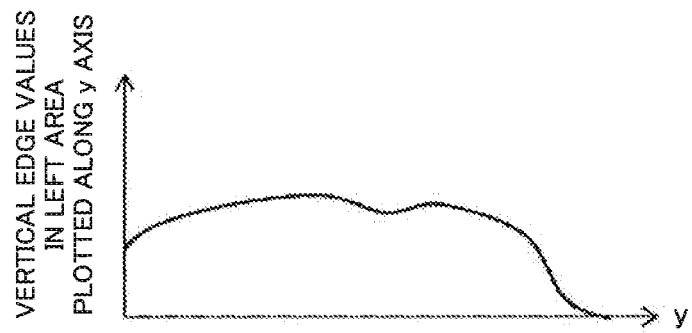
Figure 10C:
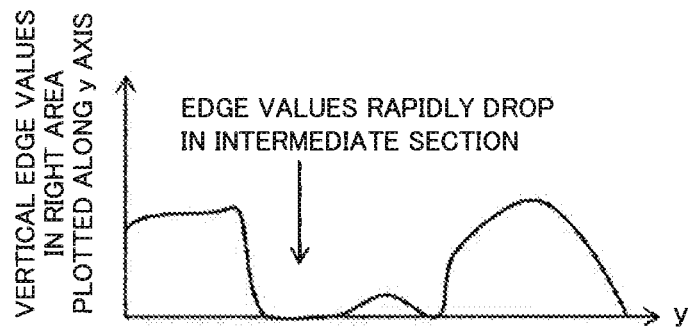

FIG. 10(b) and FIG. 10(c) are results of plotting cumulative values of vertical edge components calculated in each of the left and right areas LE, RE along the Y axis.

A sub-region 801 in FIG. 10(a) is a region including the left side of the preceding vehicle. Because vertical edges of the left side image of the vehicle are included in the left area LE of the sub-region 801, the cumulative value of vertical edge components in this area gently changes without dropping rapidly in an intermediate section, as is presented in FIG. 10(b).

On the other hand, in the right area RE which is inner toward the middle of the vehicle, there is a section with few vertical edges in bumper and body portions. Hence, as is presented in FIG. 10(c), the cumulative value of vertical edge components in this area drops rapidly in an intermediate section where vertical edges lessen, which corresponds to the bumper and body portions.

Therefore, for left and right areas LE, RE, it is determined whether or not the cumulative value of vertical edge components drops rapidly in an intermediate section (whether or not there is a section without vertical edge components). For a left area LE or right area RE for which it was found that the cumulative value of vertical edge components drops (there is a section without vertical edge), it is determined that a portion of the vehicle contour is not imaged in that area and that area is inner than the portion of the vehicle contour.

In other words, if the cumulative value of vertical edge components drops (there is a section without vertical edge) in either of the left and right areas LE, RE, it is determined that dividing based on the gray-scaled image is incorrect and the vehicle image region was incorrectly divided into right and left spaced sub-regions.

In this case, because incorrect dividing was performed based on the gray-scaled image, the following are performed: merging the sub-regions whose areas including a section without vertical edge are next to each other and detecting an object imaged in the merged region as a preceding vehicle.

That is, because the drop of the cumulative value of vertical edge components (a section without vertical edge) is detected in the right area RE of the left sub-region 801 of the rear surface image and in the left area LE of the right sub-region 802 of the rear surface image, the sub-regions 801 and 802 are the sub-regions whose areas including a section without vertical edge are next to each other and these sub-regions 801 and 802 are merged together to enclose the rear surface image.

In this way, even if the vehicle color is dark and the luminance of a shade portion is used as the luminance of the road surface in the luminance difference D calculation, it is possible to clip the vehicle region properly and perform Forward Collision Warning and Adaptive Cruise Control, and the like appropriately for the detected vehicle.

On the other hand, in the case where three pedestrians line, as is presented in FIG. 7, when a group region created based on the range image, which is presented in FIG. 7(*a*), was divided as is presented in FIG. 7(*b*), the contour of a pedestrian is included in the left and right areas of each sub-region. Hence, the drop of the cumulative value of vertical edge components (a section without vertical edge) does not occur in both the left and right areas LE, RE and the sub-regions resulting from the dividing based on the gray-scaled image are fixed as the regions of objects without merging.

A determination as to whether or not the cumulative value of vertical edge components drops (there is a section without vertical edge) can be made by using various methods; the determination can be made, e.g., based on how much the cumulative value of vertical edge components deviates (differs) between the left and right areas LE, RE; based on comparison of the cumulative value of vertical edge components to a threshold value; and based on derivative along Y-axis (vertical direction) of the cumulative value of vertical edge components.

The present invention is not limited to the foregoing description of the embodiment and various modifications may be made thereto without departing from the scope of the present invention.

For example, in the foregoing embodiment, an example was set forth in which an object detection device and method pertaining to the present invention are applied to the vehicle driving assist system, but such application is not limited to the vehicle driving assist system.

For grouping based on a range image, various heretofore known processing methods can be applied which are disclosed in, e.g., Japanese Patent Application Laid-Open No. 2008-065634.

REFERENCE SIGNS LIST

101 . . . camera unit
101*a*, 101*b* . . . camera
102 . . . image signal processing unit
103 . . . control unit
104 . . . speaker
105 . . . accelerator
106 . . . brake
107 . . . vehicle
201*a*, 201*b* . . . CMOS
202*a*, 202*b* . . . DSP
203 . . . CPU
204 . . . image processing unit
204, 205 . . . image input I/F
206 . . . memory
207 . . . program

The invention claimed is:

1. An object detection device comprising:
a range image generating unit that generates a range image based on a pair of gray-scaled images;
a grouping unit that groups adjacent regions having range data representing close distances in the range image; and
a dividing unit that divides a group region created by the grouping based on the gray-scaled images;
wherein the dividing unit divides the group region into laterally separated sub-regions, based on differences between the luminance values of pixels in a vertical line below a ground plane above which objects are imaged and the luminance values of pixels in a vertical line above the ground plane in the gray-scaled images; and
wherein the dividing unit divides the group region into laterally separated sub-regions, based on a boundary between a region where the luminance difference is large and a region where the luminance difference is small.

2. An object detection device comprising:
a range image generating unit that generates a range image based on a pair of gray-scaled images;
a grouping unit that groups adjacent regions having range data representing close distances in the range image;
a dividing unit that divides a group region created by the grouping based on the gray-scaled images; and
a merging unit that merges sub-regions made based on the gray-scaled images, based on vertical edges in the sub-regions made based on the gray-scaled images;
wherein the dividing unit divides the group region into laterally separated sub-regions, based on differences between the luminance values of pixels in a vertical line below a ground plane above which objects are imaged and the luminance values of pixels in a vertical line above the ground plane in the gray-scaled images; and
wherein, if a section without vertical edge exists in either of the left and right areas of each of sub-regions made based on the gray-scaled images, the merging unit merges sub-regions whose areas including a section without vertical edge are next to each other.

3. The object detection device according to claim 2,
wherein the pair of gray-scaled images is gray-scaled images based on images captured by a pair of image capturing units mounted on a vehicle, and
wherein the object detection device further comprises a vehicle detecting unit that detects, as a vehicle, an object imaged in a merged region by the merging unit.

4. An object detection method comprising the steps of:
generating a range image based on a pair of gray-scaled images;
grouping adjacent regions having range data representing close distances in the range image; and
dividing a group region created by the grouping based on the gray-scaled images;
wherein the dividing step divides the group region into laterally separated sub-regions, based on differences between the luminance values of pixels in a vertical line below a ground plane above which objects are imaged and the luminance values of pixels in a vertical line above the ground plane in the gray-scaled images;
wherein the dividing step comprises the steps of:
calculating differences between the luminance values of pixels in a vertical line below a ground plane above which objects are imaged and the luminance values of pixels in a vertical line above the ground plane in the gray-scaled images; and
dividing the group region into laterally separated sub-regions based on the differences between the luminance values.

5. An object detection method comprising the steps of:
generating a range image based on a pair of gray-scaled images;
grouping adjacent regions having range data representing close distances in the range image;
dividing a group region created by the grouping based on the gray-scaled images;
wherein the dividing step divides the group region into laterally separated sub-regions, based on differences between the luminance values of pixels in a vertical line below a ground plane above which objects are imaged and the luminance values of pixels in a vertical line above the ground plane in the gray-scaled images;
determining whether or not a section without vertical edge exists in either of the left and right areas of each of sub-regions made based on the gray-scaled images; and
merging sub-regions whose areas including a section without vertical edge are next to each other.

* * * * *